US012567689B2

(12) United States Patent
Kimura

(10) Patent No.: US 12,567,689 B2
(45) Date of Patent: Mar. 3, 2026

(54) CONNECTOR ASSEMBLY AND CONNECTING METHOD

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 354 days.

(21) Appl. No.: 18/467,950

(22) Filed: Sep. 15, 2023

(65) Prior Publication Data

US 2024/0178595 A1 May 30, 2024

(30) Foreign Application Priority Data

Nov. 30, 2022 (JP) ................................ 2022-191168

(51) Int. Cl.

*H01R 12/77* (2011.01)
*H01R 13/516* (2006.01)
*H01R 13/629* (2006.01)

(52) U.S. Cl.

CPC ......... *H01R 12/774* (2013.01); *H01R 13/516* (2013.01); *H01R 13/629* (2013.01)

(58) Field of Classification Search

CPC .. H01R 12/774; H01R 13/516; H01R 13/629; H01R 4/28; H01R 12/63; H01R 12/7011; H01R 13/02; H01R 13/40; H01R 13/502; H01R 43/00

See application file for complete search history.

(56) References Cited

U.S. PATENT DOCUMENTS 4,647,125 A * 3/1987 Landi .................... H01R 12/61 439/67
4,859,204 A * 8/1989 Daly ...................... H01R 12/68 439/422
5,057,032 A * 10/1991 Kaufman ............... H01R 12/83 439/62
5,163,836 A * 11/1992 Young .................. H01R 12/714 439/67
5,356,308 A * 10/1994 Toba .................. H01R 13/5219 439/495

(Continued)

FOREIGN PATENT DOCUMENTS

DE 10050797 A1 4/2002
GB 2350497 A 11/2000

(Continued)

*Primary Examiner* — Truc T Nguyen

(74) *Attorney, Agent, or Firm* — MUNCY, GEISSLER, OLDS & LOWE, P.C.

(57) ABSTRACT

The connector assembly includes: a sheet type conductive member including a flexible conductor; an electric wire; and a connector, in which the connector includes a first insulator including a first retaining surface and a second insulator including a second retaining surface, the sheet type conductive member includes a first sheet portion including a retained portion disposed on the first retaining surface and a second sheet portion disposed on the second retaining surface, a protrusion portion and the conductor portion of the electric wire are accommodated in a recess portion of the first insulator in a state where the conductor portion of the electric wire is disposed along a surface of the protrusion portion of the second insulator.

17 Claims, 12 Drawing Sheets

(56) References Cited

U.S. PATENT DOCUMENTS

| | | | | |
|---|---|---|---|---|
| 5,730,619 | A * | 3/1998 | Hamlin | H01R 13/193 439/573 |
| 6,247,951 | B1 * | 6/2001 | Di Liello | H01R 12/61 439/492 |
| 6,302,704 | B1 * | 10/2001 | Belanger, Jr. | H05K 7/1438 361/709 |
| 6,447,305 | B1 * | 9/2002 | Roberts | H01R 12/774 439/495 |
| 6,520,810 | B1 * | 2/2003 | LePottier | H01R 12/592 439/701 |
| 7,269,896 | B2 * | 9/2007 | Edwardsen | H05K 3/325 29/33 M |
| 2005/0037653 | A1 * | 2/2005 | Comerci | H01R 12/716 439/329 |
| 2005/0266725 | A1 * | 12/2005 | Pabst | H01R 12/61 439/494 |
| 2006/0228932 | A1 * | 10/2006 | Komiyama | H01R 13/514 439/467 |
| 2006/0252301 | A1 * | 11/2006 | Matsuoka | H01R 12/772 439/495 |
| 2006/0292900 | A1 * | 12/2006 | Pabst | H01R 12/79 439/67 |
| 2008/0009180 | A1 * | 1/2008 | Ikuta | H01R 12/592 439/495 |
| 2008/0242139 | A1 * | 10/2008 | Matsuoka | H01R 12/57 439/271 |
| 2009/0053943 | A1 * | 2/2009 | Fink | H01R 12/774 439/876 |
| 2010/0075541 | A1 * | 3/2010 | Niitsu | H01R 12/774 439/658 |
| 2010/0184330 | A1 * | 7/2010 | Wu | H01R 13/65918 439/607.28 |
| 2010/0203747 | A1 * | 8/2010 | Hu | H05K 1/189 174/254 |
| 2011/0059644 | A1 * | 3/2011 | Kuo | H01R 12/00 439/449 |
| 2011/0130030 | A1 * | 6/2011 | Morita | H01R 43/0249 29/860 |
| 2012/0149232 | A1 * | 6/2012 | Balzano | H01R 13/22 439/370 |
| 2012/0196466 | A1 * | 8/2012 | Igarashi | H01R 12/775 439/329 |
| 2013/0130536 | A1 * | 5/2013 | Terasaka | H01R 4/48 439/350 |
| 2021/0210882 | A1 * | 7/2021 | Peterson | H01R 11/05 |
| 2023/0223717 | A1 * | 7/2023 | Kinoshita | H01R 12/63 439/625 |

FOREIGN PATENT DOCUMENTS

| | | |
|---|---|---|
| JP | 2007214087 A | 8/2007 |
| WO | WO2010129568 A1 | 11/2010 |

* cited by examiner

CONNECTOR ASSEMBLY AND CONNECTING METHOD

BACKGROUND OF THE INVENTION

The present invention relates to a connector assembly and a connecting method, particularly to a connector assembly and a connecting method for electrically connecting a conductor portion of an electric wire to a flexible conductor exposed on a surface of a sheet type conductive member.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric path connecting the electrode disposed at the measurement site to the place where the connector is attached, and if such an electric path is formed from a flexible conductor, this causes higher electric resistance and higher cost.

To interconnect an electrode constituted of a flexible conductor and a wearable device by use of an electric wire that has low electric resistance and is inexpensive, it has been desired to develop a small-sized connector connecting the electric wire to the flexible conductor disposed on a garment.

As a connector for connecting an electric wire to a flexible conductor, for instance, JP 2007-214087 A discloses a connector as shown in FIG. 23. This connector includes a first connector 2 connected to an end of a substrate 1 and a second connector 4 attached to tips of electric wires 3, and the electric wires 3 can be connected to a flexible conductor of the substrate 1 by fitting the second connector 4 to the first connector 2.

However, the first connector 2 and the second connector 4 that are separately attached to the end of the substrate 1 and the tips of the electric wires 3 need to be fitted to each other in order to connect the electric wires 3 to the flexible conductor of the substrate 1, and this causes a larger size of a device; and there is a separable connection portion between the first connector 2 and the second connector 4, which impairs the reliability of electric connection.

SUMMARY OF THE INVENTION

The present invention has been made to solve the conventional problem as above and aims at providing a connector assembly that can electrically connect a conductor portion of an electric wire to a flexible conductor exposed on a surface of a sheet type conductive member with high reliability while its size can be reduced.

The present invention also aims at providing a connecting method for electrically connecting a conductor portion of an electric wire to a flexible conductor exposed on a surface of a sheet type conductive member.

The connector assembly according to the present invention includes:

- a sheet type conductive member including a flexible conductor exposed on a surface thereof;
- an electric wire including a conductor portion; and
- a connector for connecting the conductor portion to the flexible conductor,
- in which the connector includes a first insulator and a second insulator, the first insulator including a first retaining surface and a recess portion formed in the first retaining surface, and the second insulator including a second retaining surface opposed to the first retaining surface and a protrusion portion formed on the second retaining surface to protrude therefrom and corresponding to the recess portion,
- the sheet type conductive member includes a first sheet portion and a second sheet portion, the first sheet portion including a retained portion disposed on the first retaining surface, and the second sheet portion being disposed on the second retaining surface,
- the flexible conductor is exposed on a surface of the retained portion of the first sheet portion, and an end portion of the flexible conductor is disposed in the recess portion,
- the protrusion portion and the conductor portion of the electric wire are accommodated in the recess portion in a state where the conductor portion of the electric wire is disposed along a surface of the protrusion portion, and
- the first insulator and the second insulator are fixed to each other such that overlapping portions of the retained portion of the first sheet portion and the second sheet portion are held between the first retaining surface and the second retaining surface, whereby the flexible conductor makes contact with and is electrically connected to the conductor portion of the electric wire in the recess portion.

The connecting method according to the present invention is a connecting method for connecting a conductor portion of an electric wire to a flexible conductor exposed on a surface of a sheet type conductive member, the connecting method including:

- in a connector forming component in which a first insulator and a second insulator are joined to each other by an insulator joint portion such that a first retaining surface of the first insulator and a second retaining surface of the second insulator are situated in a same plane, disposing a retained portion of a first sheet portion of the sheet type conductive member having the flexible conductor exposed thereon on the first retaining surface, and a second sheet portion of the sheet type conductive member joined to the retained portion via a sheet joint portion on the second retaining surface,
- disposing the conductor portion of the electric wire along a surface of a protrusion portion formed on the second retaining surface to protrude therefrom,
- cutting and removing the insulator joint portion from the connector forming component,
- folding the sheet joint portion to thereby accommodate the protrusion portion and the conductor portion of the electric wire together with an end portion of the flexible conductor exposed on the retained portion of the first sheet portion into a recess portion formed in the first retaining surface of the first insulator, with the first retaining surface and the second retaining surface being opposed to each other, and
- fixing the first insulator and the second insulator to each other while the retained portion of the first sheet portion and the second sheet portion are held between the first retaining surface and the second retaining surface, whereby the flexible conductor makes contact with and is electrically connected to the conductor portion of the electric wire in the recess portion.

DETAILED DESCRIPTION OF THE INVENTION

Embodiments of the present invention are described below based on the accompanying drawings.

Embodiment 1

Figure 1:
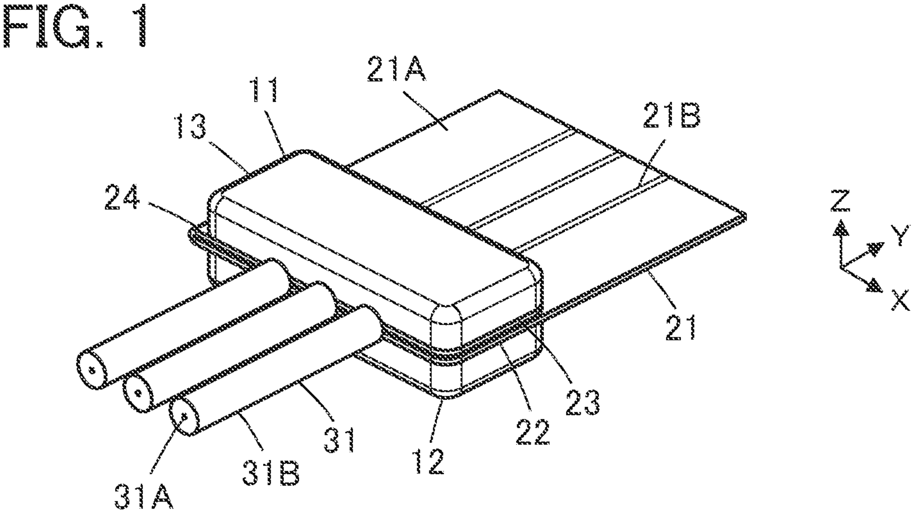
FIG. 1 is a perspective view showing a connector assembly according to Embodiment 1 when viewed from an obliquely upper position.
Figure 2:
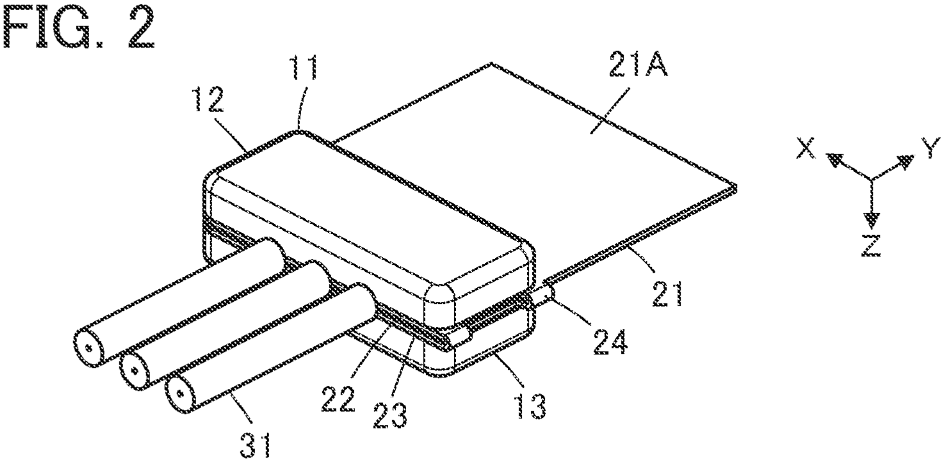
FIG. 2 is a perspective view showing the connector assembly according to Embodiment 1 when viewed from an obliquely lower position.

FIGS. 1 and 2 show a connector assembly according to Embodiment 1. The connector assembly is obtained by connecting conductor portions 31A of a plurality of coated electric wires 31 to a sheet type conductive member 21 by means of a connector 11.

The connector 11 includes a first insulator 12 and a second insulator 13 each made of an insulating resin material.

The sheet type conductive member 21 is formed of a sheet type insulating base 21A provided with a plurality of flexible conductors 21B on a surface thereof. The flexible conductors 21B are aligned in a predetermined alignment direction, each form a linearly extending pattern, and are exposed on a surface of the sheet type conductive member 21.

The sheet type conductive member 21 has a structure in which a first sheet portion 22 and a second sheet portion 23 are joined to each other by a sheet joint portion 24 and is disposed between the first insulator 12 and the second insulator 13 with the second sheet portion 23 overlapping the first sheet portion 22 when the sheet joint portion 24 is folded.

The coated electric wires 31 are aligned in the predetermined alignment direction as with the flexible conductors 21B of the sheet type conductive member 21 and each extend in a direction perpendicular to the alignment direction in parallel to the surface of the sheet type conductive member 21. Each coated electric wire 31 has a structure in which the outer periphery of the conductor portion 31A is covered with an insulating coating portion 31B. With the connector 11, the conductor portions 31A of the coated electric wires 31 are electrically connected to the flexible conductors 21B exposed on the surface of the sheet type conductive member 21. The conductor portion 31A of the coated electric wire 31 may be either a so-called solid wire constituted of one conductor or a so-called stranded wire constituted of plural conductors being stranded.

For convenience, the sheet type conductive member 21 is defined as extending along an XY plane, the predetermined alignment direction of the flexible conductors 21B and the coated electric wires 31 is referred to as "X direction," the direction in which each coated electric wire 31 extends toward the connector 11 is referred to as "+Y direction," and the direction perpendicular to an XY plane is referred to as "Z direction."

Figure 3:
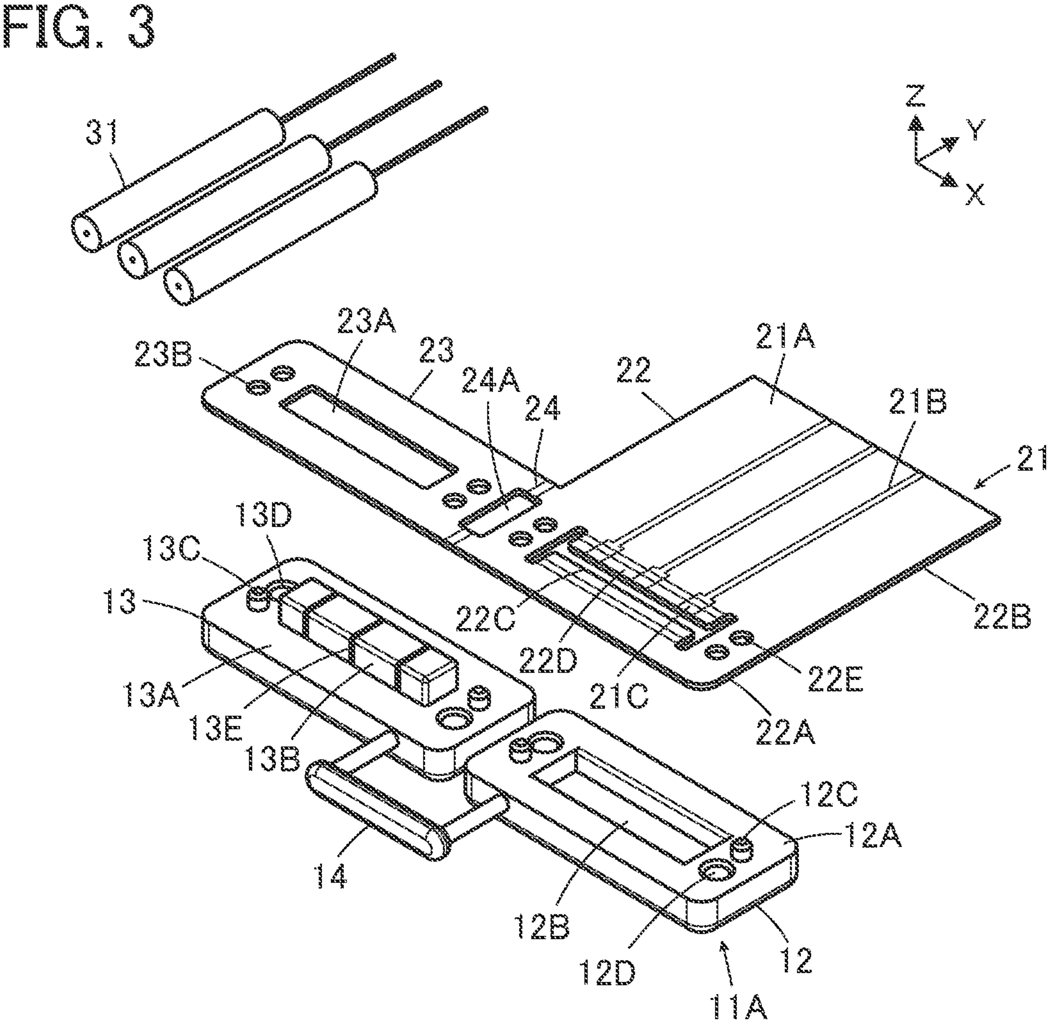
FIG. 3 is an assembly view of the connector assembly according to Embodiment 1.

FIG. 3 shows an assembly view of the connector assembly according to Embodiment 1. The sheet type conductive member 21 is disposed on the −Z direction side of the coated electric wires 31, and a connector forming component 11A is disposed on the −Z direction side of the sheet type conductive member 21.

For the assembling operation of the connector assembly, the connector forming component 11A is used. The connector forming component 11A is made of an insulating resin material and has a structure in which the first insulator 12 and the second insulator 13 are joined to each other by an insulator joint portion 14.

The first insulator 12 includes a first retaining surface 12A extending along an XY plane and facing in the +Z direction, and a recess portion 12B extending in the X direction and recessed in the −Z direction is formed in the first retaining surface 12A. In addition, on an outside of the recess portion 12B in the first retaining surface 12A, formed are a pair of bosses 12C protruding in the +Z direction and a pair of fixing holes 12D recessed in the −Z direction.

The second insulator 13 includes a second retaining surface 13A extending along an XY plane and facing in the +Z direction, and a protrusion portion 13B extending in the X direction and protruding in the +Z direction is formed in the second retaining surface 13A. In addition, on an outside of the protrusion portion 13B in the second retaining surface 13A, formed are a pair of bosses 13C protruding in the +Z direction and a pair of fixing holes 13D recessed in the −Z direction. The protrusion portion 13B corresponds to the recess portion 12B of the first insulator 12, and the pair of bosses 13C and the pair of fixing holes 13D correspond to the pair of bosses 12C and the pair of fixing holes 12D of the first insulator 12. The protrusion portion 13B is provided with a plurality of electric wire retaining grooves 13E each extending in a YZ plane. The electric wire retaining grooves 13E correspond to the conductor portions 31A of the coated electric wires 31.

The insulator joint portion 14 joins the −Y directional side surface of the first insulator 12 to the −Y directional side surface of the second insulator 13 while the first and second insulators 12 and 13 are aligned in the X direction, and the first retaining surface 12A of the first insulator 12 and the second retaining surface 13A of the second insulator 13 are situated in the same XY plane owing to the insulator joint portion 14.

The first sheet portion 22 of the sheet type conductive member 21 has the X-directional width equivalent to the X directional length of the first insulator 12, and a retained portion 22A corresponding to the first retaining surface 12A of the first insulator 12 is disposed at the −Y directional end portion of the first sheet portion 22, while an extension portion 22B extending in the +Y direction is disposed on the +Y direction side of the retained portion 22A. The retained portion 22A and the extension portion 22B are formed integrally and continuously in the Y direction.

The retained portion 22A is provided with an H-shaped opening portion 22C extending long in the X direction. The opening portion 22C corresponds to the recess portion 12B of the first insulator 12, and at the +Y directional edge and the −Y directional edge of the opening portion 22C, formed separately are fold portions 22D that are folded into the recess portion 12B of the first insulator 12 when the connector assembly is assembled.

On the surface of the first sheet portion 22 facing in the +Z direction, the flexible conductors 21B each having a linear pattern extend continuously from the retained portion 22A to the extension portion 22B along the Y direction, and the −Y directional end portions 21C of the flexible conductors 21B are arranged on a surface of the fold portion 22D positioned at the +Y directional edge of the opening portion 22C.

The second sheet portion 23 of the sheet type conductive member 21 is joined to the retained portion 22A via the sheet joint portion 24 so as to be arranged on the −X direction side of the retained portion 22A side by side and has a rectangular opening portion 23A extending long in the X direction. The opening portion 23A corresponds to the protrusion portion 13B of the second insulator 13. The sheet joint portion 24 has an opening portion 24A in its center portion.

The second sheet portion 23 consists only of the insulating base 21A that constitutes the sheet type conductive member 21, and the flexible conductor 21B is not provided in the second sheet portion 23.

Moreover, the first sheet portion 22 is provided with a plurality of through holes 22E on the periphery of the opening portion 22C, and the second sheet portion 23 is provided with a plurality of through holes 23B on the periphery of the opening portion 23A.

The through holes 22E and 23B correspond to the pair of bosses 12C and the pair of fixing holes 12D of the first insulator 12 and the pair of bosses 13C and the pair of fixing holes 13D of the second insulator 13.

Figure 4:
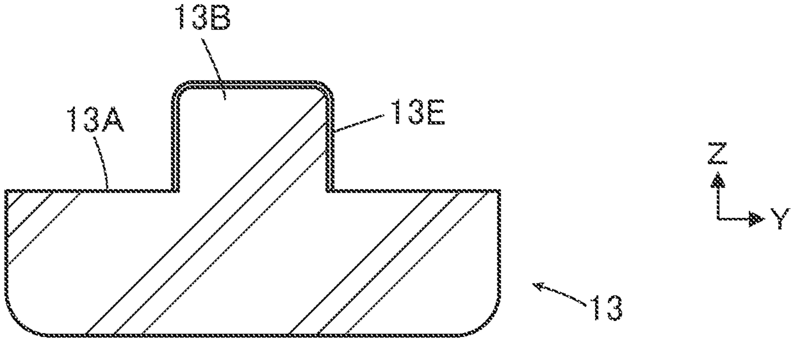
FIG. 4 is a cross sectional view showing a second insulator of a connector forming component in Embodiment 1.

As shown in FIG. 4, the electric wire retaining groove 13E of the second insulator 13 is continuously formed in the −Y directional side surface, the +Y directional side surface, and the +Z directional top surface of the protrusion portion 13B in a YZ plane. The electric wire retaining groove 13E is used to retain the conductor portion 31A of the corresponding coated electric wire 31 when the connector assembly is assembled.

Figure 5:
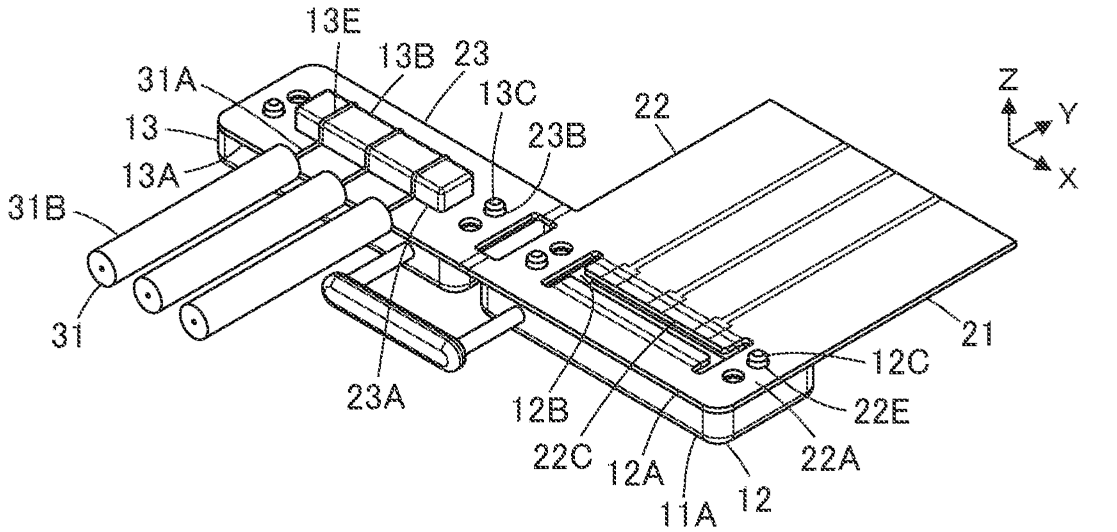
FIG. 5 is a perspective view showing a state where a sheet type conductive member and electric wires are disposed on the connector forming component in Embodiment 1.

In the assembling operation of the connector assembly, first, the sheet type conductive member 21 is disposed on the connector forming component 11A as shown in FIG. 5. In this process, the retained portion 22A of the first sheet portion 22 is disposed on the first retaining surface 12A of the first insulator 12, and the opening portion 22C of the retained portion 22A is situated on the +Z direction side of the recess portion 12B of the first insulator 12. The protrusion portion 13B of the second insulator 13 penetrates the opening portion 23A of the second sheet portion 23, and the second sheet portion 23 is disposed on the second retaining surface 13A of the second insulator 13.

In addition, the pair of bosses 12C of the first insulator 12 penetrate the corresponding through holes 22E of the first insulator 22, and the pair of bosses 13C of the second insulator 13 penetrate the corresponding through holes 23B of the second sheet portion 23.

Subsequently, the coated electric wires 31 are disposed on the −Y direction side of the second insulator 13, and the conductor portion 31A drawn from the insulating coating portion 31B of each coated electric wire 31 is inserted in the corresponding electric wire retaining groove 13E of the protrusion portion 13B of the second insulator 13, the protrusion portion 13B penetrating the opening portion 23A of the second sheet portion 23 to project in the +Z direction. The conductor portion 31A is inserted in the electric wire retaining groove 13E that is formed continuously from the −Y directional side surface to the +Y directional side surface via the +Z directional top surface of the protrusion portion 13B such that the conductor portion 31A crosses over the protrusion portion 13B, whereby the conductor portion 31A is retained by the protrusion portion 13B.

The depth of the electric wire retaining groove 13E is designed to be shallower than the diameter of the conductor portion 31A; the conductor portion 31A is retained by the protrusion portion 13B in such a manner that the conductor portion 31A is not fully buried in the electric wire retaining groove 13E but partly sticks out from the side surfaces and the top surface of the protrusion portion 13B.

Figure 6:
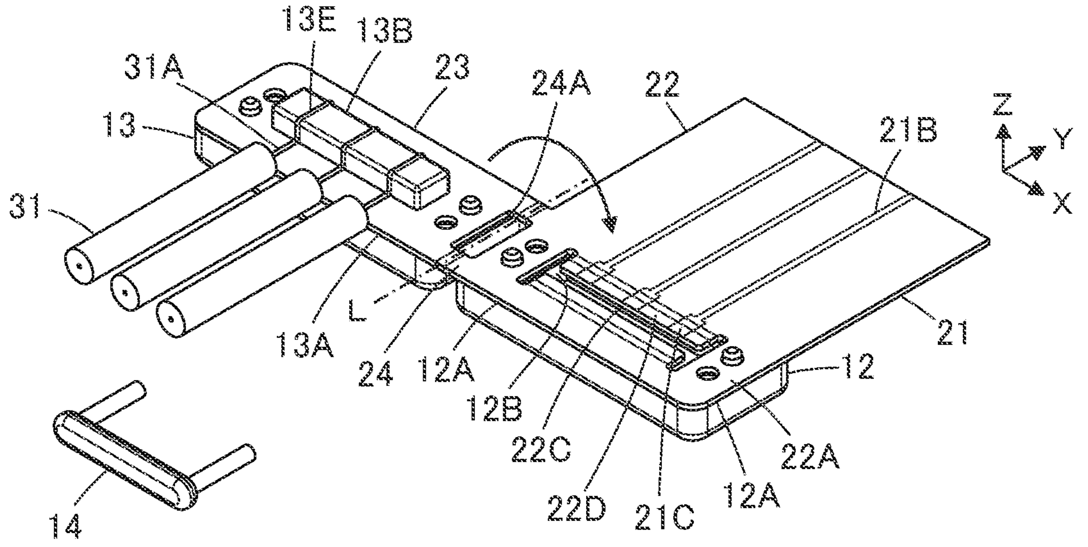
FIG. 6 is a perspective view showing a state where an insulator joint portion is cut and removed from the connector forming component in Embodiment 1.

In this state, the insulator joint portion 14 is cut and removed from the first and second insulators 12 and 13 as shown in FIG. 6. It may be designed such that, by preliminarily forming a cut at a root part of the insulator joint portion 14 joined to the first and second insulators 12 and 13, for example, the insulator joint portion 14 can be easily cut and removed without use of a dedicated cutting jig or another tool.

When the insulator joint portion 14 is cut and removed, the first insulator 12 and the second insulator 13 are separated from each other, while the first sheet portion 22 and the second sheet portion 23 of the sheet type conductive member 21 are joined to each other by the sheet joint portion 24.

Here, the sheet joint portion 24 is folded along a folding line L extending along the Y direction perpendicular to the X direction that is the alignment direction of the coated electric wires 31 and the flexible conductors 21B, whereby the second insulator 13 together with the second sheet portion 23 and the coated electric wires 31 retained by the second insulator 13 is rotated about the folding line L by 180 degrees such that the first retaining surface 12A of the first insulator 12 and the second retaining surface 13A of the second insulator 13 are opposed to each other.

In this process, the sheet joint portion 24 can be easily folded because the opening portion 24A is formed in the center portion of the sheet joint portion 24.

Accordingly, the protrusion portion 13B of the second insulator 13 and the conductor portions 31A of the coated electric wires 31 retained by the protrusion portion 13B are accommodated in the recess portion 12B of the first insulator 12 via the opening portion 22C while folding the fold portion 22D of the retained portion 22A of the first sheet portion 22.

Figure 7:
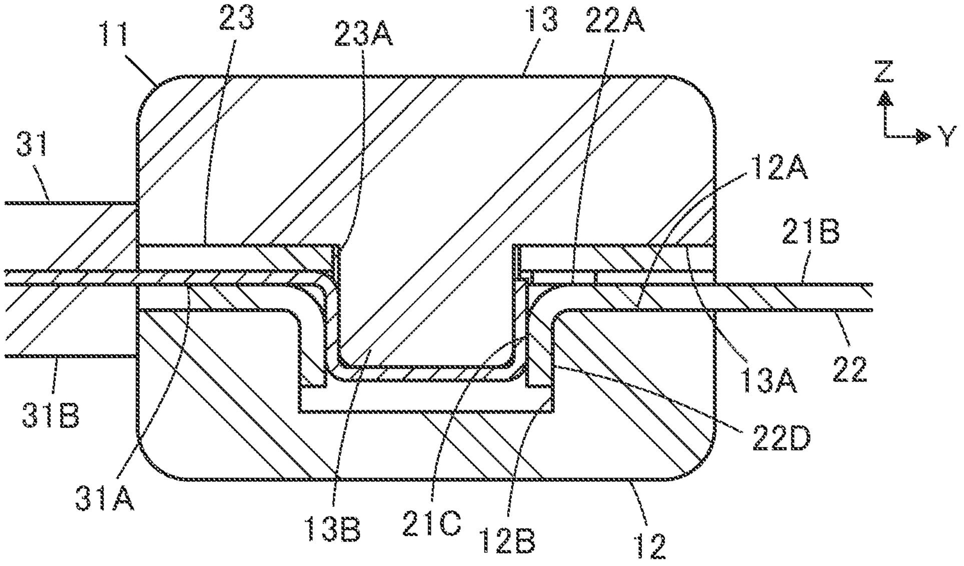
FIG. 7 is a cross sectional view showing the connector assembly according to Embodiment 1.

This process leads to a state where the fold portion 22D of the retained portion 22A and the conductor portion 31A of the coated electric wire 31 are held between the side surface of the protrusion portion 13B and an inner side surface of the recess portion 12B as shown in FIG. 7. At this time, since the −Y directional end portion 21C of the flexible conductor 21B is disposed on the surface of the fold portion 22D of the retained portion 22A, the end portion 21C of the flexible conductor 21B makes contact with the conductor portion 31A of the coated electric wire 31 with predetermined contact pressure and is electrically connected to the conductor portion 31A.

Similarly, the end portions 21C of the plurality of flexible conductors 21B are electrically connected to the conductor portions 31A of the plurality of coated electric wires 31 on a one-by-one basis.

When the second sheet portion 23 is superposed on the retained portion 22A with the first retaining surface 12A of the first insulator 12 and the second retaining surface 13A of the second insulator 13 facing each other, the second sheet portion 23 overlaps and makes contact with the retained portion 22A, and the pair of bosses 12C of the first insulator 12 shown in FIG. 3 penetrate the corresponding through holes 23B of the second sheet portion 23 and are fitted in the fixing holes 13D of the second insulator 13, while the pair of bosses 13C of the second insulator 13 penetrate the corresponding through holes 22E of the first sheet portion 22 and are fitted in the pair of fixing holes 12D of the first insulator 12.

In this manner, the first insulator 12 and the second insulator 13 are fixed to each other, whereby the connector 11 is formed. It should be noted that when the first insulator 12, the retained portion 22A, the second sheet portion 23, and the second insulator 13 superposed on one another are glued with use of, for example, a water-resistant adhesive, a waterproof connector can be realized.

As described above, in the connector forming component 11A in which the sheet type conductive member 21 is positionally aligned by means of the through holes 22E of the first sheet portion 22 and the through holes 23B of the second sheet portion 23 together with the bosses 12C of the first insulator 12 and the bosses 13C of the second insulator 13, the conductor portions 31A of the coated electric wires 31 are retained by the electric wire retaining grooves 13E of the protrusion portion 13B of the second insulator 13, whereby the conductor portions 31A of the coated electric wires 31 can be positionally aligned with the flexible conductors 21B of the sheet type conductive member 21 to establish electrical connection with high reliability while the size of the connector assembly can be reduced.

In addition, with use of the single connector forming component 11A having a structure in which the first insulator 12 and the second insulator 13 are joined to each other by the insulator joint portion 14, the number of components can be reduced, and after the insulator joint portion 14 is separated, the first insulator 12 and the second insulator 13 are joined to each other via the sheet joint portion 24 of the sheet type conductive member 21, enabling easy assembly of the connector assembly by folding the sheet joint portion 24.

In addition, as shown in FIG. 7, since a root part of the conductor portion 31A drawn from the coated electric wire 31 is held between the first insulator 12 and the second insulator 13 via the first sheet portion 22 and the second sheet portion 23, the coated electric wire 31 is firmly retained in connection to the connector 11; the coated electric wire 31 can be prevented from being damaged even when an external force acts on the coated electric wire 31 or the connector 11.

While the sheet joint portion 24 of the sheet type conductive member 21 folded in the assembly operation of the connector assembly sticks out in the −X direction to an outside of the connector 11 composed of the first insulator 12 and the second insulator 13 as shown in FIGS. 1 and 2, the sheet joint portion 24 thus sticking out can be cut and removed.

Embodiment 2

Figure 8:
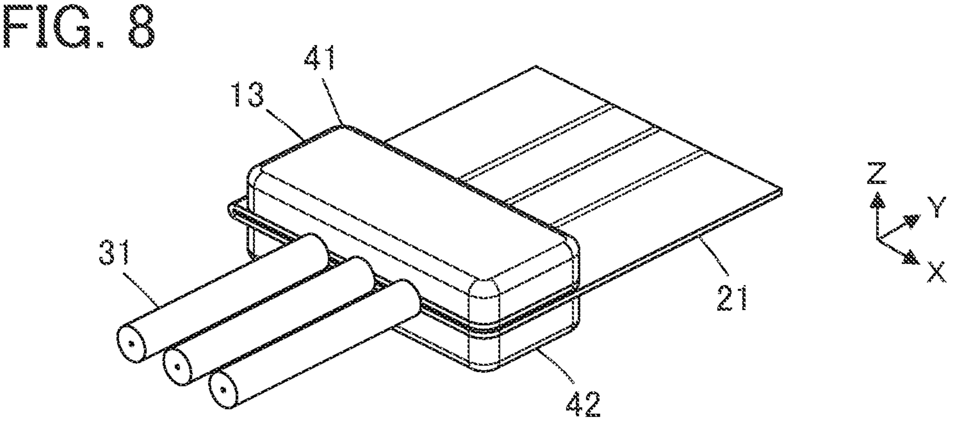
FIG. 8 is a perspective view showing a connector assembly according to Embodiment 2 when viewed from an obliquely upper position.
Figure 9:
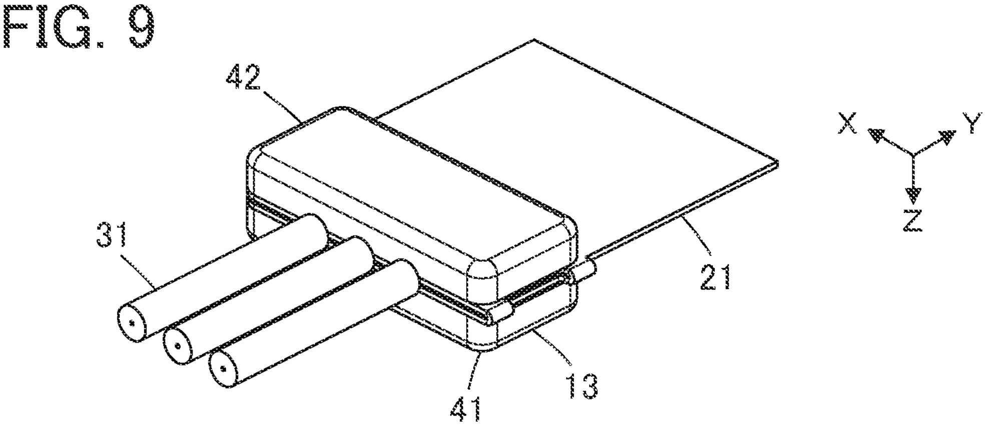
FIG. 9 is a perspective view showing the connector assembly according to Embodiment 2 when viewed from an obliquely lower position.

FIGS. 8 and 9 show a connector assembly according to Embodiment 2. This connector assembly is configured such that, in the connector assembly of Embodiment 1, a connector 41 is composed of a first insulator 42 and the second insulator 13, the first insulator 42 being used in place of the first insulator 12, and that a plurality of spring members to be described later are further incorporated in the connector 41.

Figure 10:
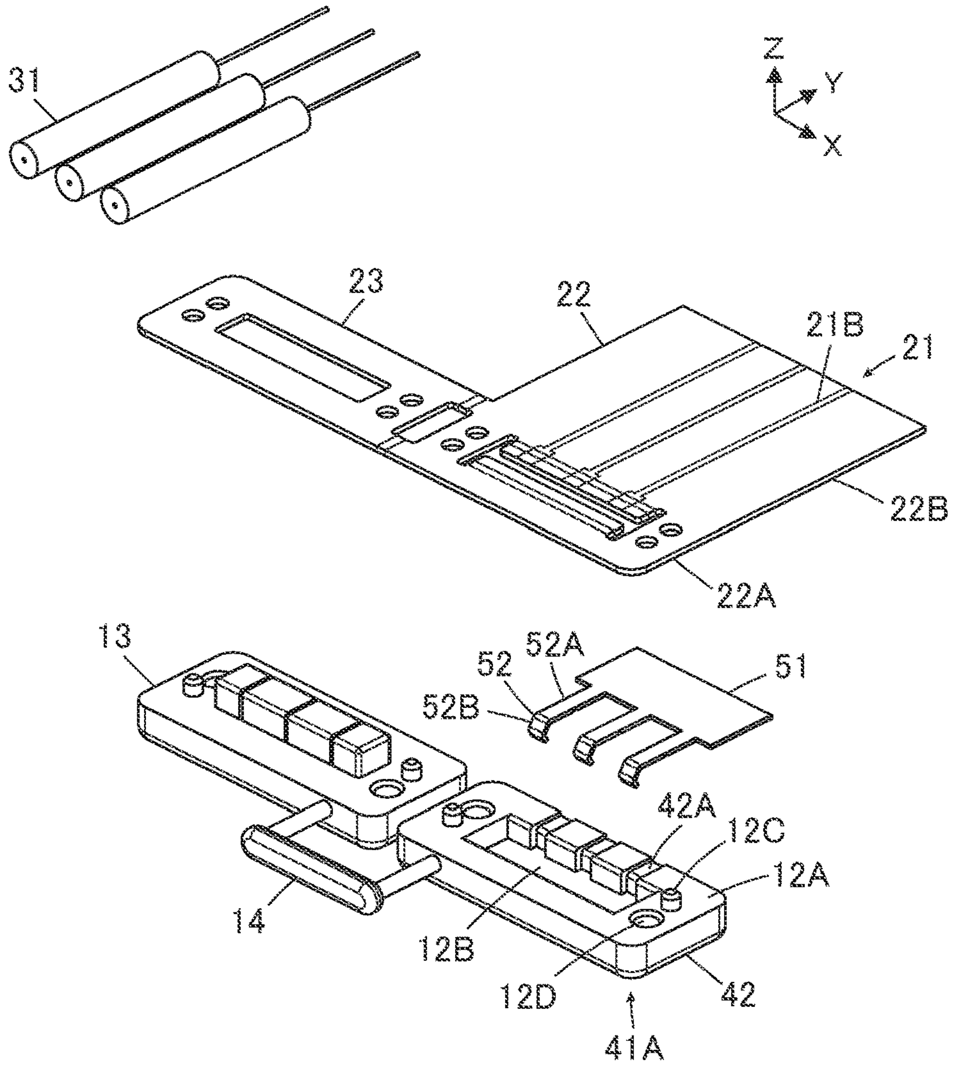
FIG. 10 is an assembly view of the connector assembly according to Embodiment 2.

FIG. 10 shows an assembly view of the connector assembly according to Embodiment 2. The sheet type conductive member 21 is disposed on the −Z direction side of the coated electric wires 31, a plurality of spring members 52 joined to a carrier 51 are disposed on the −Z direction side of the sheet type conductive member 21, and a connector forming component 41A is disposed on the −Z direction side of the spring members 52.

The sheet type conductive member 21 and the coated electric wires 31 are the same as those used in Embodiment 1.

The connector forming component 41 is configured such that, in the connector forming component 11A used in Embodiment 1, the first insulator 42 in place of the first insulator 12 is joined to the second insulator 13 via the insulator joint portion 14, and is made of an insulating resin material.

The first insulator 42 is obtained by forming a plurality of spring member retaining grooves 42A in the first insulator 12 used in Embodiment 1. That is, the first insulator 42 includes the first retaining surface 12A extending along an XY plane and facing in the +Z direction, and the recess portion 12B extending in the X direction and recessed in the −Z direction is formed in the first retaining surface 12A. The spring member retaining grooves 42A are formed on the +Y direction side of the recess portion 12B. The spring member retaining grooves 42A each extend from the first retaining surface 12A to the +Y directional inner surface of the recess portion 12B.

In addition, on an outside of the recess portion 12B in the first retaining surface 12A, formed are the pair of bosses 12C protruding in the +Z direction and the pair of fixing holes 12D recessed in the −Z direction.

The spring members 52 joined to the carrier 51 are made of a metal material and each include a band plate-shaped retaining portion 52A extending in the −Y direction from the carrier 51 along an XY plane and a spring portion 52B bending at the −Y directional end of the retaining portion 52A to extend in the −Z direction.

In the assembly operation of the connector assembly, the spring members 52 are separately disposed from the +Z direction in the spring member retaining grooves 42A of the first insulator 42 shown in FIG. 10 to be retained therein. The spring members 52 are retained by the first insulator 42 while being joined to the carrier 51, and the spring members 52B face an inner surface of the recess portion 12B of the first insulator 42.

Figure 11:
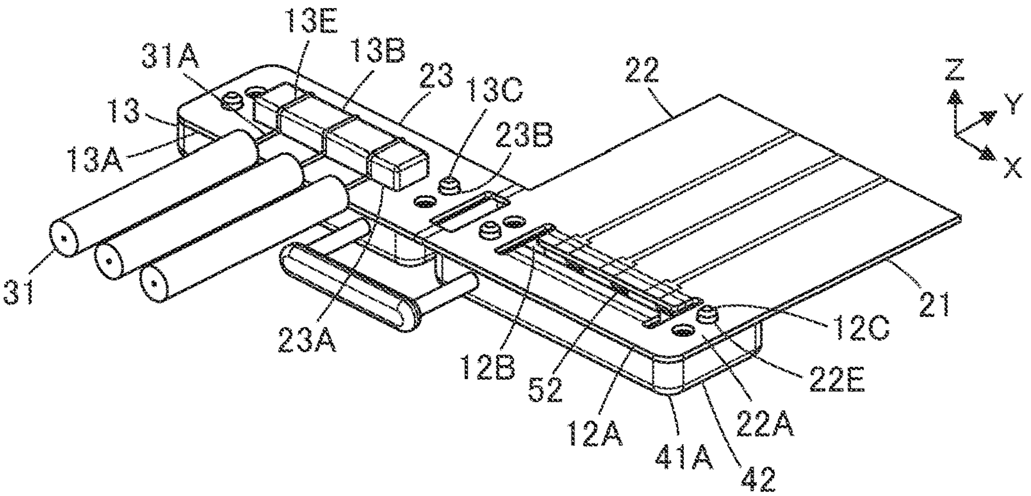
FIG. 11 is a perspective view showing a state where a spring member, the sheet type conductive member, and the electric wires are disposed on the connector forming component in Embodiment 2 when viewed from an obliquely upper position.

Next, as shown in FIG. 11, the sheet type conductive member 21 is disposed on the connector forming component 41A and the spring members 52. In this process, similarly to Embodiment 1, the retained portion 22A of the first sheet portion 22 is disposed on the first retaining surface 12A of the first insulator 42, and the second sheet portion 23 is disposed on the second retaining surface 13A of the second insulator 13.

In addition, the conductor portions 31A of the coated electric wires 31 are separately inserted in the corresponding electric wire retaining grooves 13E of the protrusion portion 13B of the second insulator 13 to be retained therein, the protrusion portion 13B penetrating the opening portion 23A of the second sheet portion 23 to project in the +Z direction.

In addition, the pair of bosses 12C of the first insulator 42 penetrate the corresponding through holes 22E of the first insulator 22, and the pair of bosses 13C of the second insulator 13 penetrate the corresponding through holes 23B of the second sheet portion 23.

Figure 12:
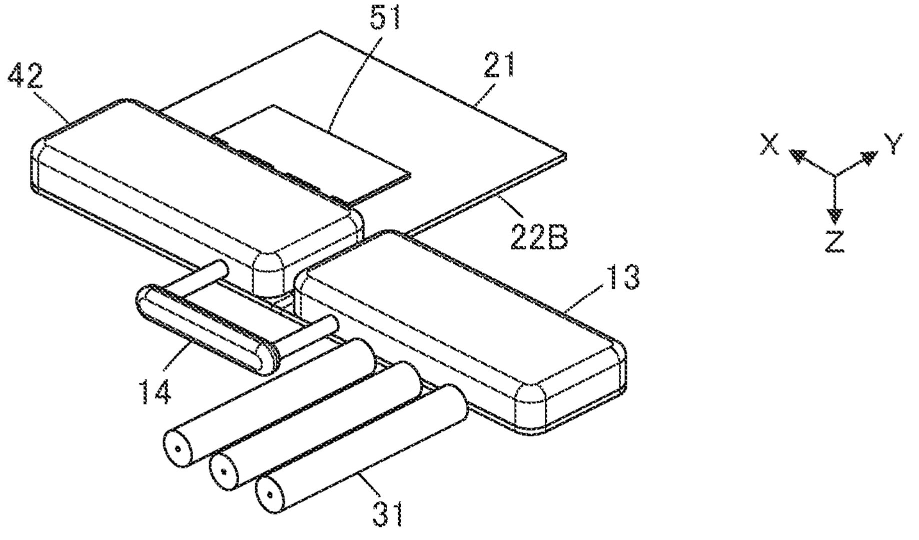
FIG. 12 is a perspective view showing the state where the spring member, the sheet type conductive member, and the electric wires are disposed on the connector forming component in Embodiment 2 when viewed from an obliquely lower position.

At this time, as shown in FIG. 12, the carrier 51 joined to the spring members 52 is situated on the rear surface facing in the −Z direction of the extension portion 22B of the sheet type conductive member 21 extending from the first insulator 42 in the +Y direction.

Figure 13:
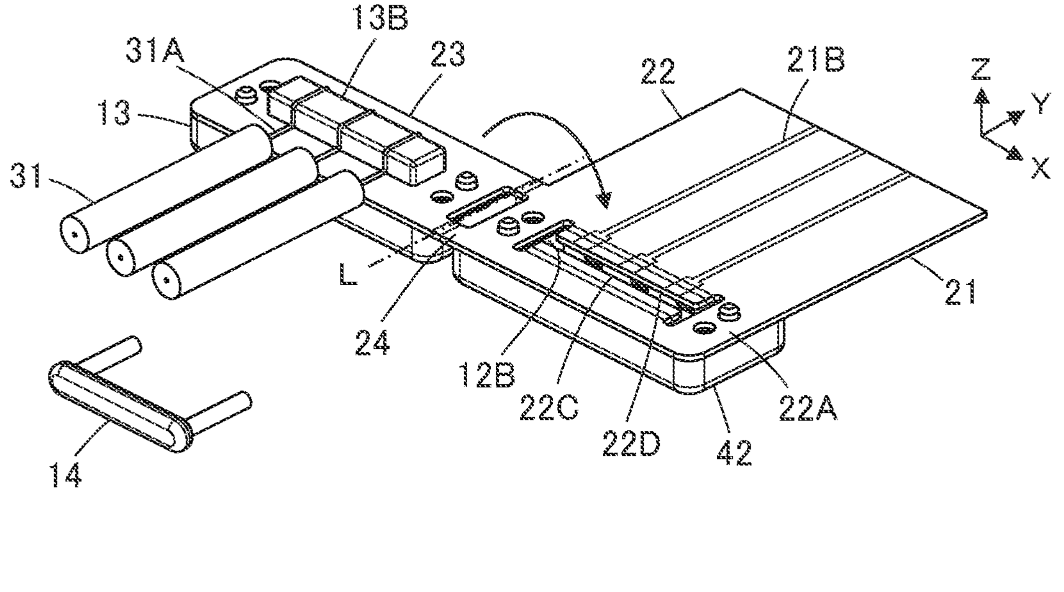
FIG. 13 is a perspective view showing a state where the insulator joint portion is cut and removed from the connector forming component in Embodiment 2 when viewed from an obliquely upper position.
Figure 14:
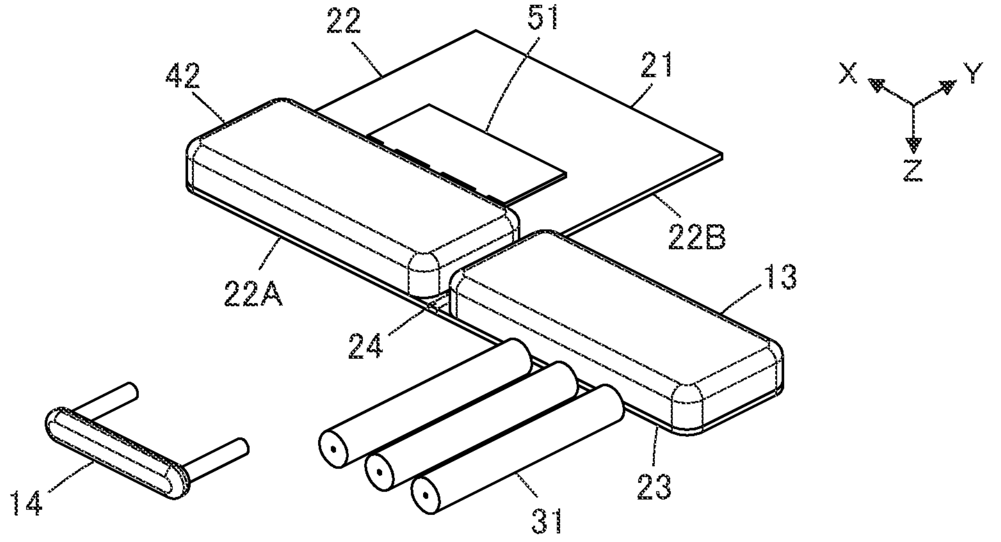
FIG. 14 is a perspective view showing the state where the insulator joint portion is cut and removed from the connector forming component in Embodiment 2 when viewed from an obliquely lower position.

In this state, the insulator joint portion 14 is cut and removed from the first and second insulators 42 and 13 as shown in FIGS. 13 and 14. Accordingly, the first insulator 42 and the second insulator 13 are separated from each other, while the first sheet portion 22 and the second sheet portion 23 of the sheet type conductive member 21 are joined to each other by the sheet joint portion 24.

Here, the sheet joint portion 24 is folded along the folding line L extending along the Y direction, whereby the second insulator 13 together with the second sheet portion 23 and the coated electric wires 31 retained by the second insulator 13 is rotated about the folding line L by 180 degrees.

Accordingly, the protrusion portion 13B of the second insulator 13 and the conductor portions 31A of the coated electric wires 31 retained by the protrusion portion 13B are accommodated in the recess portion 12B of the first insulator 42 via the opening portion 22C while folding the fold portion 22D of the retained portion 22A of the first sheet portion 22.

Figure 15:
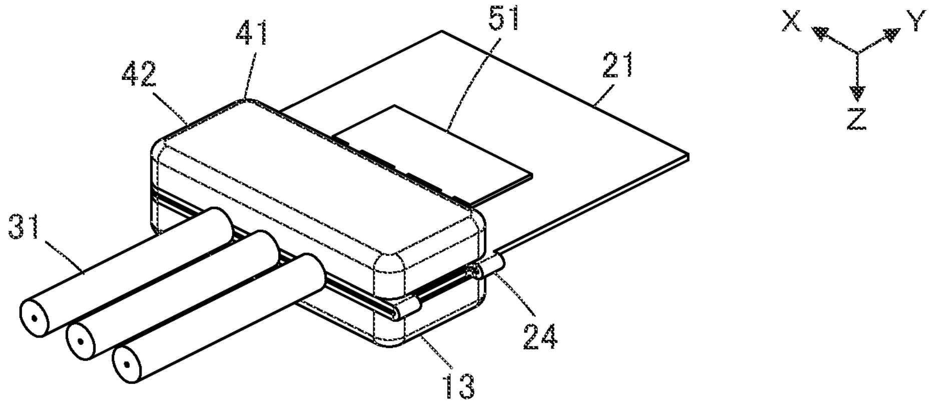
FIG. 15 is a perspective view showing a state where a first insulator and the second insulator are fixed to each other in Embodiment 2 when viewed from an obliquely lower position.

As shown in FIG. 15, the second insulator 13 is superposed on the first insulator 42 on its +Z direction side, and similarly to Embodiment 1, the first insulator 42 and the second insulator 13 are fixed to each other, whereby the connector 41 is formed. At this time, the spring members 52 shown in FIG. 10 are pressed from the +Z direction by the rear surface facing in the −Z direction of the retained portion 22A of the first sheet portion 22 to be thereby fixed in the connector 41.

After the connector 41 is formed in this manner, the carrier 51 extending from the first insulator 42 in the +Y direction along the rear surface facing in the −Z direction of the extension portion 22B of the sheet type conductive member 21 is separated from the spring members 52. It may be designed such that, by preliminarily forming cuts or grooves in the band plate-shaped retaining portions 52A of the spring members 52, for example, the carrier 51 can be easily separated out without use of a dedicated cutting jig or another tool.

Figure 16:
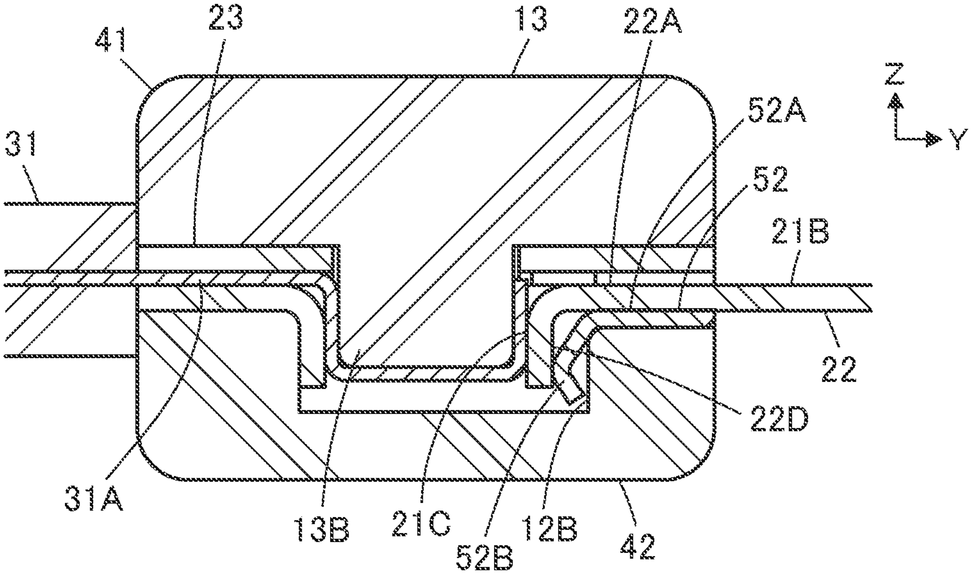
FIG. 16 is a cross sectional view showing the connector assembly according to Embodiment 2.

As shown in FIG. 16, inside the connector 41, the fold portion 22D of the retained portion 22A and the conductor portion 31A of the coated electric wire 31 are held between a side surface of the protrusion portion 13B and the spring portion 52B of the spring member 52, and the end portion 21C of the flexible conductor 21B disposed on the surface of the fold portion 22D makes contact with the conductor portion 31A of the coated electric wire 31 with predetermined contact pressure owing to an elastic force of the spring portion 52B and is electrically connected to the conductor portion 31A.

Similarly, the end portions 21C of the plurality of flexible conductors 21B are electrically connected to the conductor portions 31A of the plurality of coated electric wires 31 on a one-by-one basis.

As described above, in the connector assembly of Embodiment 2, while the second insulator 13 is fixed to the first insulator 42 to thereby reduce the size of the connector assembly, presence of the spring members 52 can improve reliability in electrical connection between the flexible conductors 21B of the sheet type conductive member 21 and the conductor portions 31A of the coated electric wires 31.

Embodiment 3

Figure 17:
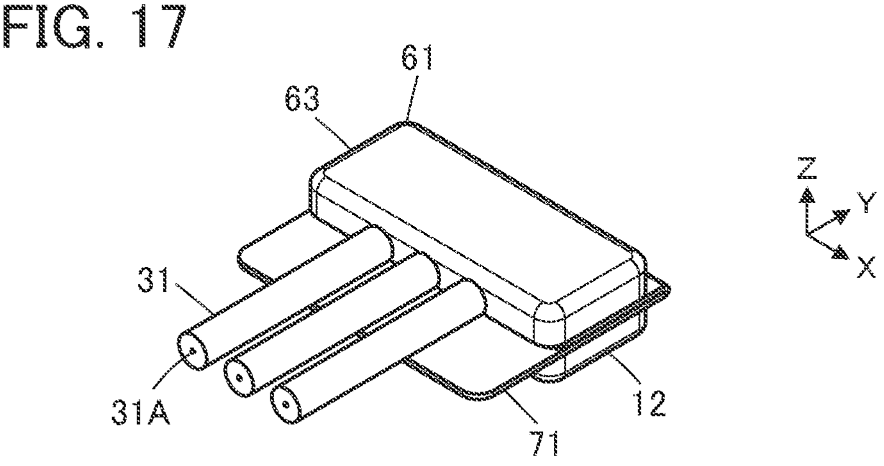
FIG. 17 is a perspective view showing a connector assembly according to Embodiment 3.

FIG. 17 shows a connector assembly according to Embodiment 3. The connector assembly is obtained by connecting the conductor portions 31A of the coated electric wires 31 to a sheet type conductive member 71 by means of a connector 61.

The connector 61 includes the first insulator 12 and a second insulator 63 each made of an insulating resin material.

The electric wires 31 and the second insulator 12 are the same as those used the connector assembly of Embodiment 1.

Figure 18:
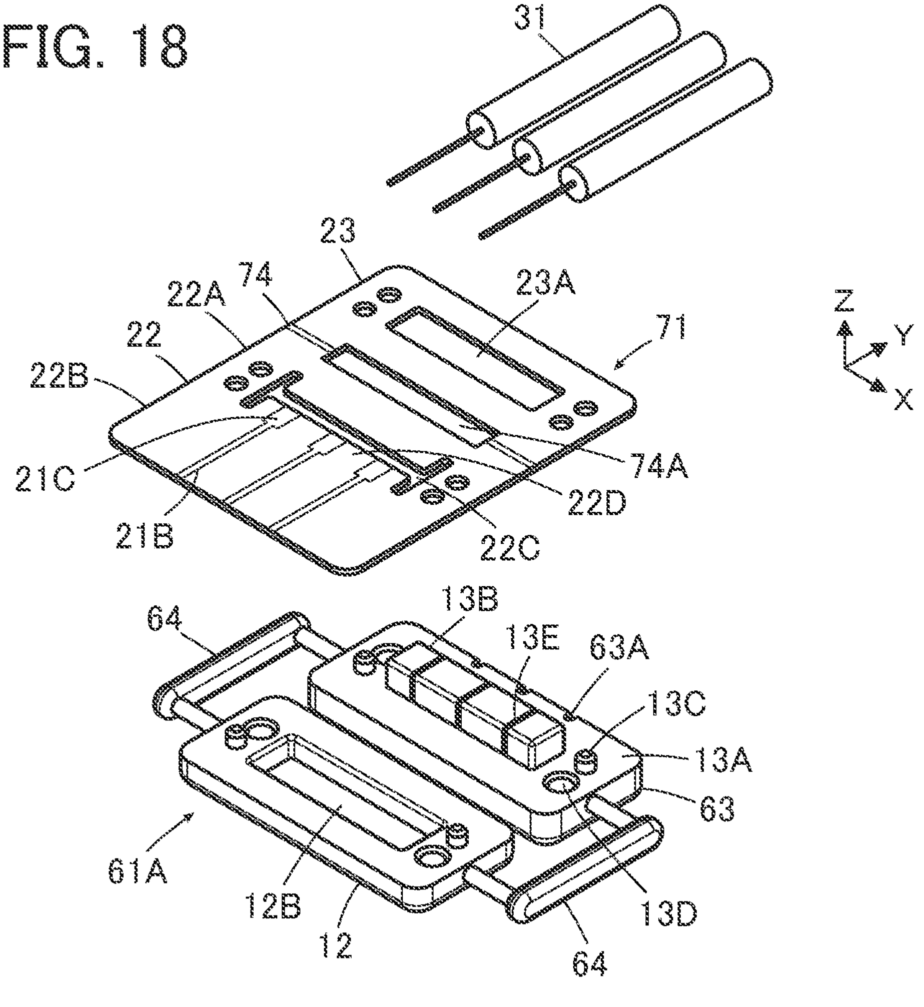
FIG. 18 is an assembly view of the connector assembly according to Embodiment 3.

FIG. 18 shows an assembly view of the connector assembly according to Embodiment 3. The sheet type conductive member 71 is disposed on the −Z direction side of the coated electric wires 31, and a connector forming component 61A is disposed on the −Z direction side of the sheet type conductive member 71.

The connector forming component 61A is configured such that, in the connector forming component 11A used in Embodiment 1, the second insulator 63 in place of the second insulator 13 is joined to the first insulator 12 via a pair of insulator joint portions 64, and is made of an insulating resin material.

The second insulator 63 is obtained by forming a plurality of electric wire accommodation grooves 63A in the second insulator 13 used in Embodiment 1. That is, the second insulator 63 includes the second retaining surface 13A extending along an XY plane and facing in the +Z direction, and the protrusion portion 13B extending in the X direction and protruding in the +Z direction is formed in the second retaining surface 13A. The protrusion portion 13B is provided with the electric wire retaining grooves 13E each extending in a YZ plane, and the electric wire accommodation grooves 63A each extending from the second retaining surface 13A in the −Z direction are formed on the +Y directional side surface of the second insulator 63 so as to correspond to the electric wire retaining grooves 13E.

In addition, on an outside of the protrusion portion 13B in the second retaining surface 13A, formed are the pair of bosses 13C protruding in the +Z direction and the pair of fixing holes 13D recessed in the −Z direction.

The second insulator 63 is disposed at the same X directional position as that of the first insulator 12 and arranged on the +Y direction side of the first insulator 12 side by side, and the +X directional side surface and the −X directional side surface of the first insulator 12 are separately joined to the +X directional side surface and the −X directional side surface of the second insulator 63 by the pair of insulator joint portions 64. The first retaining surface 12A of the first insulator 12 and the second retaining surface 13A of the second insulator 63 are situated in the same XY plane owing to the pair of insulator joint portions 64.

The sheet type conductive member 71 is obtained by, in the sheet type conductive member 21 used in Embodiment 1, disposing the first sheet portion 22 such that the extension portion 22B is situated on the −Y direction side of the retained portion 22A, and joining the first sheet portion 22 to the second sheet portion 23 via a sheet joint portion 74 such that the second sheet portion 23 is arranged on the +Y direction side of the retained portion 22A side by side. That is, the first sheet portion 22 and the second sheet portion 23 are disposed at the same X directional position. The flexible conductors 21B extend in the −Y direction from the H-shaped opening portion 22C in the retained portion 22A of the first sheet portion 22, and the end portions 21C of the flexible conductors 21B are disposed at the fold portion 22D formed at the −Y directional edge of the opening portion 22C.

The second sheet portion 23 is provided with the rectangular opening portion 23A extending long in the X direction. In addition, the sheet joint portion 74 has an opening portion 74A in its center portion.

Figure 19:
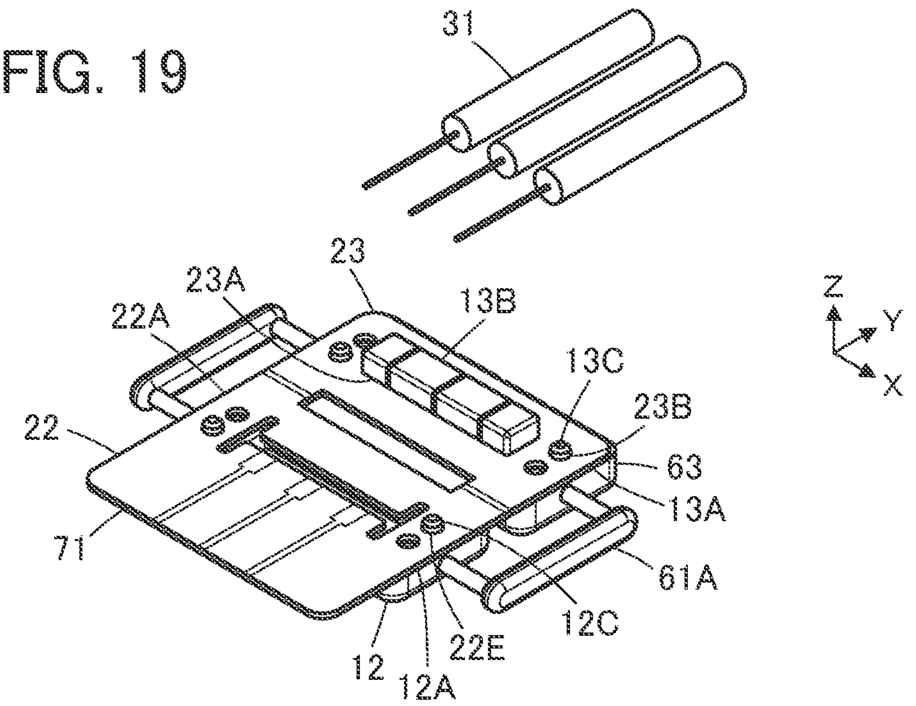
FIG. 19 is a perspective view showing a state where a sheet type conductive member is disposed on a connector forming component in Embodiment 3.

In the assembling operation of the connector assembly, first, the sheet type conductive member 71 is disposed on the connector forming component 61A as shown in FIG. 19. In this process, the retained portion 22A of the first sheet portion 22 is disposed on the first retaining surface 12A of the first insulator 12, and the second sheet portion 23 is disposed on the second retaining surface 13A of the second insulator 63. The protrusion portion 13B of the second insulator 63 penetrates the opening portion 23A of the second sheet portion 23.

In addition, the pair of bosses 12C of the first insulator 12 penetrate the corresponding through holes 22E of the first insulator 22, and the pair of bosses 13C of the second insulator 63 penetrate the corresponding through holes 23B of the second sheet portion 23.

Figure 20:
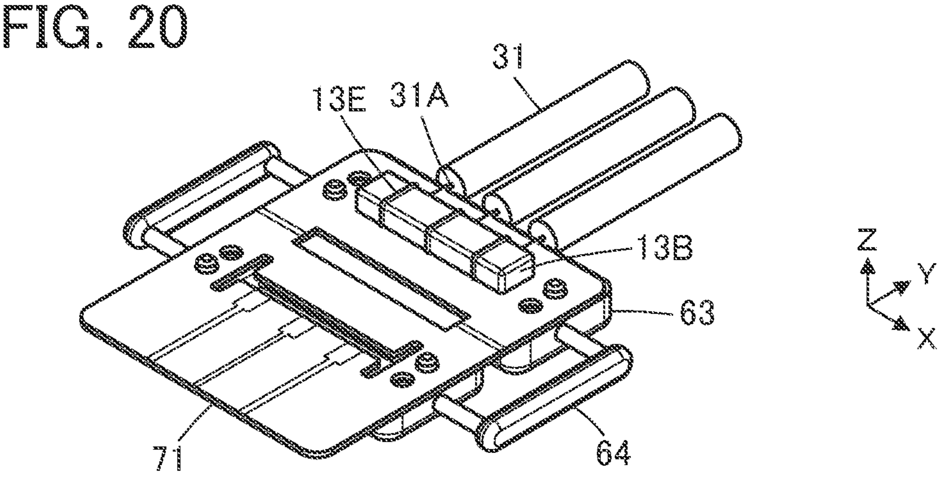
FIG. 20 is a perspective view showing a state where a sheet type conductive member and the electric wires are disposed on the connector forming component in Embodiment 3.

Subsequently, as shown in FIG. 20, the coated electric wires 31 are disposed on the +Y direction side of the second insulator 63, and the conductor portion 31A drawn in the −Y direction from the insulating coating portion 31B of each coated electric wire 31 is inserted in the corresponding electric wire retaining groove 13E of the protrusion portion 13B of the second insulator 63.

The conductor portion 31A drawn in the −Y direction from the coated electric wire 31 is bent in the +Z direction and accommodated in the corresponding electric wire accommodation groove 63A of the second insulator 63 shown in FIG. 18, and the conductor portion 31A is further bent in the −Y direction at the +Y directional end portion of the second sheet portion 23 and inserted in the corresponding electric wire retaining groove 13E of the protrusion portion 13B.

Figure 21:
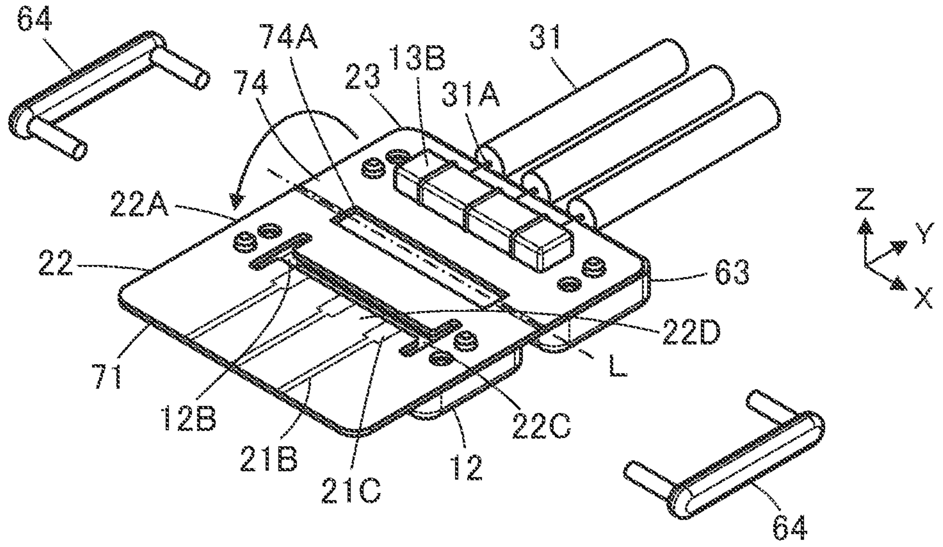
FIG. 21 is a perspective view showing a state where an insulator joint portion is cut and removed from the connector forming component in Embodiment 3.

In this state, the pair of insulator joint portions 64 are cut and removed from the first insulator 12 and the second insulator 63 as shown in FIG. 21. Accordingly, the first insulator 12 and the second insulator 63 are separated from each other, while the first sheet portion 22 and the second sheet portion 23 of the sheet type conductive member 71 are joined to each other by the sheet joint portion 74.

Here, the sheet joint portion 74 is folded along the folding line L extending along the X direction that is the alignment direction of the coated electric wires 31 and the flexible conductors 21B, whereby the second insulator 63 together with the second sheet portion 23 and the coated electric wires 31 retained by the second insulator 63 is rotated about the folding line L by 180 degrees.

In this process, the sheet joint portion 74 can be easily folded because the opening portion 74A is formed in the center portion of the sheet joint portion 74.

Accordingly, the protrusion portion 13B of the second insulator 63 and the conductor portions 31A of the coated electric wires 31 retained by the protrusion portion 13B are accommodated in the recess portion 12B of the first insulator 12 via the opening portion 22C while folding the fold portion 22D of the retained portion 22A of the first sheet portion 22. In addition, similarly to Embodiment 1, the first insulator 12 and the second insulator 63 are fixed to each other, whereby the connector 61 is formed.

Figure 22:
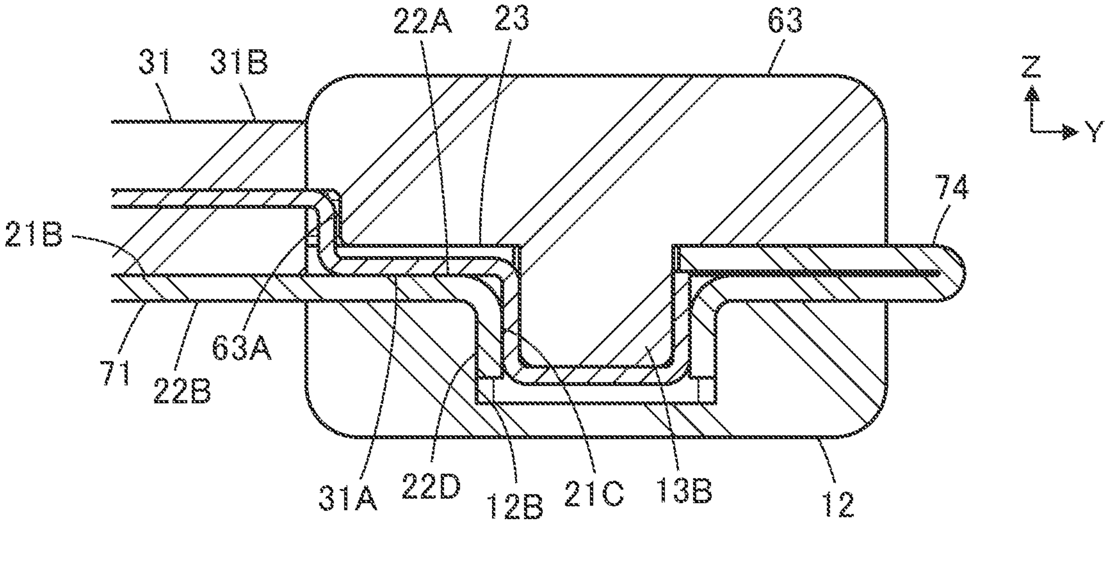
FIG. 22 is a cross sectional view showing the connector assembly according to Embodiment 3.
Figure 23:
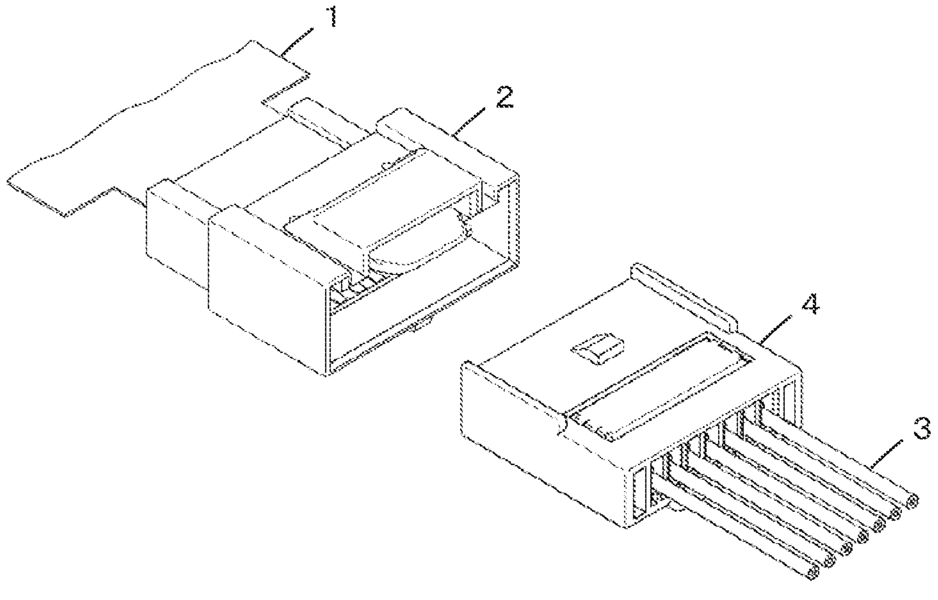
FIG. 23 PRIOR ART
FIG. 23 is a perspective view showing a conventional connector.

As a result, the fold portion 22D of the retained portion 22A and the conductor portion 31A of the coated electric wire 31 are held between the side surface of the protrusion portion 13B and the inner side surface of the recess portion 12B as shown in FIG. 22. At this time, since the end portion 21C of the flexible conductor 21B is disposed on the surface of the fold portion 22D of the retained portion 22A, the end portion 21C of the flexible conductor 21B makes contact with the conductor portion 31A of the coated electric wire 31 with predetermined contact pressure and is electrically connected to the conductor portion 31A.

Similarly, the end portions 21C of the plurality of flexible conductors 21B are electrically connected to the conductor portions 31A of the plurality of coated electric wires 31 on a one-by-one basis.

While the extension portion 22B of the first sheet portion 22 of the sheet type conductive member 71 and the coated electric wire 31 both extend in the −Y direction from the connector 61 in FIG. 22, since part of the conductor portion 31A of the coated electric wire 31 is accommodated in the electric wire accommodation groove 63A formed in the side surface of the second insulator 63 and extending in the Z direction, the insulating coating portion 31B of the coated electric wire 31 is situated on the surface facing in the +Z direction of the extension portion 22B. In other words, the insulating coating portion 31B of the coated electric wire 31 and the extension portion 22B of the sheet type conductive member 71 can extend in the −Y direction without interfering with each other in the Z direction.

As described above, also in the connector assembly of Embodiment 3, while the second insulator 63 is fixed to the first insulator 12 to thereby reduce the size of the connector assembly, the flexible conductors 21B of the sheet type conductive member 71 can be electrically connected to the conductor portions 31A of the coated electric wires 31 with high reliability.

Similarly to Embodiment 2, it is also possible to improve reliability in electric connection between the flexible conductors 21B of the sheet type conductive member 71 and the conductor portions 31A of the coated electric wires 31 by incorporation of the spring members 52 in the connector 61 in Embodiment 3.

While three flexible conductors 21B exposed on the surface of the sheet type conductive member 21, 71 are electrically connected to the conductor portions 31A of three coated electric wires 31 in Embodiments 1 to 3 above, the invention is not limited thereto; one or more flexible conductors 21B can be electrically connected to the conductor portion 31A or conductor portions 31A of one or more coated electric wires 31 in the similar manner.

While the coated electric wire 31 is used as an electric wire to be connected to the flexible conductor 21B of the sheet type conductive member 21, 71 in Embodiments 1 to 3 above, an electric wire formed of only the conductor portion 31A whose outer periphery is not covered with the insulating coating portion 31B can also be connected to the flexible conductor 21B of the sheet type conductive member 21, 71.

What is claimed is:

1. A connector assembly comprising:

a sheet type conductive member including a flexible conductor exposed on a surface thereof;

an electric wire including a conductor portion; and a connector for connecting the conductor portion to the flexible conductor, wherein the connector includes a first insulator and a second insulator, the first insulator including a first retaining surface and a recess portion formed in the first retaining surface, and the second insulator including a second retaining surface opposed to the first retaining surface and a protrusion portion formed on the second retaining surface to protrude therefrom and corresponding to the recess portion, the sheet type conductive member includes a first sheet portion and a second sheet portion, the first sheet portion including a retained portion disposed on the first retaining surface, and the second sheet portion being disposed on the second retaining surface, the flexible conductor is exposed on a surface of the retained portion of the first sheet portion, and an end portion of the flexible conductor is disposed in the recess portion, the protrusion portion and the conductor portion of the electric wire are accommodated in the recess portion in a state where the conductor portion of the electric wire is disposed along a surface of the protrusion portion, and the first insulator and the second insulator are fixed to each other such that overlapping portions of the retained portion of the first sheet portion and the second sheet portion are held between the first retaining surface and the second retaining surface, whereby the flexible conductor makes contact with and is electrically connected to the conductor portion of the electric wire in the recess portion.

2. The connector assembly according to claim 1, wherein the first sheet portion includes an extension portion extending from the retained portion to an outside of the connector along a predetermined direction, the retained portion includes a fold portion disposed in the recess portion, the flexible conductor is continuously disposed from the retained portion to the extension portion, and the end portion of the flexible conductor is disposed on the fold portion.

3. The connector assembly according to claim 2, wherein the first sheet portion includes an insulating base of a sheet type and the flexible conductor disposed on the insulating base so as to form a predetermined pattern, and the second sheet portion consists of only an insulating base of a sheet type.

4. The connector assembly according to claim 1, wherein the second sheet portion has an opening portion and is disposed on the second retaining surface with the protrusion portion being inserted in the opening portion.

5. The connector assembly according to claim 1, wherein the sheet type conductive member includes a sheet joint portion joining the first sheet portion and the second sheet portion to each other, and the sheet joint portion sticks out to an outside of the connector.

6. The connector assembly according to claim 1, wherein the end portion of the flexible conductor and the conductor portion of the electric wire are held between a side surface of the protrusion portion and an inner side surface of the recess portion to thereby make contact with and be electrically connected to each other.

7. The connector assembly according to claim 1, wherein the connector includes a spring member that presses the end portion of the flexible conductor and the conductor portion of the electric wire against each other in the recess portion.

8. The connector assembly according to claim 1, wherein the conductor portion of the electric wire is disposed along both side surfaces and a top surface of the protrusion portion so as to cross over the protrusion portion.

9. The connector assembly according to claim 8, wherein the protrusion portion includes an electric wire retaining groove continuously formed on the both side surfaces and the top surface, and the conductor portion of the electric wire is accommodated in the recess portion while being inserted in the electric wire retaining groove.

10. The connector assembly according to claim 1, wherein a boss formed on one of the first retaining surface and the second retaining surface is inserted in a fixing hole formed in another of the first retaining surface and the second retaining surface, whereby the first insulator and the second insulator are fixed to each other.

11. The connector assembly according to claim 1, wherein the recess portion extends in a predetermined direction along the first retaining surface, the protrusion portion extends in the predetermined direction along the second retaining surface, the sheet type conductive member includes a plurality of the flexible conductors disposed on the first sheet portion and aligned in the predetermined direction, and the plurality of the flexible conductors are electrically connected to the conductor portions of a plurality of the electric wires aligned in the predetermined direction on a one-by-one basis.

12. The connector assembly according to claim 11, wherein the plurality of the flexible conductors and the plurality of the electric wires extend to an outside of the connector along a same direction.

13. The connector assembly according to claim 11, wherein the plurality of the flexible conductors and the plurality of the electric wires extend to an outside of the connector along opposite directions from each other.

14. A connecting method for connecting a conductor portion of an electric wire to a flexible conductor exposed on a surface of a sheet type conductive member, the connecting method comprising:

in a connector forming component in which a first insulator and a second insulator are joined to each other by an insulator joint portion such that a first retaining surface of the first insulator and a second retaining surface of the second insulator are situated in a same plane, disposing a retained portion of a first sheet portion of the sheet type conductive member having the flexible conductor exposed thereon on the first retaining surface, and a second sheet portion of the sheet type conductive member joined to the retained portion via a sheet joint portion on the second retaining surface, disposing the conductor portion of the electric wire along a surface of a protrusion portion formed on the second retaining surface to protrude therefrom, cutting and removing the insulator joint portion from the connector forming component, folding the sheet joint portion to thereby accommodate the protrusion portion and the conductor portion of the electric wire together with an end portion of the flexible conductor exposed on the retained portion of the first sheet portion into a recess portion formed in the first retaining surface of the first insulator, with the first retaining surface and the second retaining surface being opposed to each other, and fixing the first insulator and the second insulator to each other while the retained portion of the first sheet portion and the second sheet portion are held between the first retaining surface and the second retaining surface, whereby the flexible conductor makes contact with and is electrically connected to the conductor portion of the electric wire in the recess portion.

15. The connecting method according to claim 14, wherein the recess portion extends in a predetermined direction along the first retaining surface, the protrusion portion extends in the predetermined direction along the second retaining surface, the sheet type conductive member includes a plurality of the flexible conductors disposed on the first sheet portion and aligned in the predetermined direction, and the plurality of the flexible conductors are electrically connected to the conductor portions of a plurality of the electric wires aligned in the predetermined direction on a one-by-one basis.

16. The connecting method according to claim 15, wherein the insulator joint portion joins the first insulator and the second insulator in a state where the first insulator and the second insulator are aligned side by side in the predetermined direction, the sheet joint portion joins the first sheet portion and the second sheet portion in a state where the first sheet portion and the second sheet portion are aligned side by side in the predetermined direction, and after the insulator joint portion is cut and removed from the connector forming component, the sheet joint portion is folded along a folding line extending in a direction perpendicular to the predetermined direction.

17. The connecting method according to claim 15, wherein the insulator joint portion joins the first insulator and the second insulator in a state where the first insulator and the second insulator are aligned side by side in a direction perpendicular to the predetermined direction, the sheet joint portion joins the first sheet portion and the second sheet portion in a state where the first sheet portion and the second sheet portion are aligned side by side in the direction perpendicular to the predetermined direction, and after the insulator joint portion is cut and removed from the connector forming component, the sheet joint portion is folded along a folding line extending in the predetermined direction.

* * * * *